(12) United States Patent
Koukoravas et al.

(10) Patent No.: US 12,098,966 B2
(45) Date of Patent: Sep. 24, 2024

(54) DIFFERENTIAL PRESSURE MONITOR WITH A CALIBRATION PROCESS AND SYSTEM

(71) Applicant: Westermeyer Industries Inc., Bluffs, IL (US)

(72) Inventors: Theodoros Panagiotis Koukoravas, Chatham, IL (US); David Robert Frenk, Chatham, IL (US)

(73) Assignee: Westermeyer Industries Inc., Bluffs, IL (US)

( * ) Notice: Subject to any disclaimer, the term of this patent is extended or adjusted under 35 U.S.C. 154(b) by 289 days.

(21) Appl. No.: 17/529,009

(22) Filed: Nov. 17, 2021

(65) Prior Publication Data
US 2022/0155170 A1    May 19, 2022

Related U.S. Application Data

(60) Provisional application No. 63/115,118, filed on Nov. 18, 2020.

(51) Int. Cl.
| | | |
|---|---|---|
| *G01L 13/06* | (2006.01) | |
| *G01L 19/08* | (2006.01) | |
| *G01L 19/14* | (2006.01) | |
| *G01L 27/00* | (2006.01) | |

(52) U.S. Cl.
CPC ............. *G01L 13/06* (2013.01); *G01L 19/08* (2013.01); *G01L 19/14* (2013.01); *G01L 27/005* (2013.01)

(58) Field of Classification Search
None
See application file for complete search history.

(56) References Cited

U.S. PATENT DOCUMENTS

| | | | |
|---|---|---|---|
| 3,846,774 A | 11/1974 | Thorbard et al. | |
| 4,651,570 A | 3/1987 | Rosaen | |
| 6,843,110 B2 | 1/2005 | Deane et al. | |
| 6,981,422 B1 | 1/2006 | Comardo | |
| 7,469,546 B2 | 12/2008 | Kates | |
| 7,890,215 B2 | 2/2011 | Duncan | |
| 8,033,175 B2 * | 10/2011 | Sundet | G01L 9/125 73/708 |
| 9,640,344 B2 * | 5/2017 | McFarland | H01H 35/2607 |
| 10,317,261 B2 | 6/2019 | Noboa et al. | |
| 10,656,040 B2 | 5/2020 | Worth | |
| 11,244,803 B2 * | 2/2022 | Akinaga | H01J 37/32 |
| 2007/0234747 A1 * | 10/2007 | Chen | G01K 13/02 62/149 |

FOREIGN PATENT DOCUMENTS

CN            212513134 U      2/2021

* cited by examiner

*Primary Examiner* — Peter J Macchiarolo
*Assistant Examiner* — Jermaine L Jenkins
(74) *Attorney, Agent, or Firm* — Alix, Yale & Ristas, LLP

(57) ABSTRACT

A differential pressure monitor is disclosed herein, which comprises a controller comprising a processor disposed in a housing, and a memory storing instructions that, when executed by the processor, cause the processor to pre-calibrate a first pressure sensor and a second pressure sensor before initial use, and subsequently, determine the differential pressure between the first and second sensors during use of the sensors, and display an indicia representative of the differential pressure between the first and second sensors. Corresponding methods and systems also are disclosed.

20 Claims, 10 Drawing Sheets

DIFFERENTIAL PRESSURE MONITOR WITH A CALIBRATION PROCESS AND SYSTEM

RELATED APPLICATIONS

This application claims the benefit of U.S. Provisional Patent Application No. 63/115,118 filed Nov. 18, 2020, the contents of which are incorporated by reference herein in their entirety.

BACKGROUND

Pressure sensors are a vital part of every refrigeration system allowing for proper monitoring under normal operation but also diagnosing any issues that might arise. However, just like any other type of sensor there is a certain error associated with their output signal. This error is expressed as a percentage of their Full Scale Span (FSS). The FSS is the difference between the upper and the lower limits of the operating pressure range. The higher the pressure that needs to be measured, the larger the transducer error. This means that refrigeration systems operating at high pressures, for example transcritical $CO_2$ systems that can reach pressures upwards of 1000 PSI, may have pressure measurement errors.

It would be useful to develop a differential pressure monitor, a system and a method for further reducing the margin of error in pressure differential measurements, especially for use in high pressure systems.

SUMMARY

One embodiment disclosed herein is a differential pressure monitor comprising a controller that includes a processor disposed in a housing, and a memory storing instructions that, when executed by the processor, cause the processor to pre-calibrate a first pressure sensor and a second pressure sensor before initial use and determine the differential pressure between the first and second sensors during use of the sensors. The instructions, when executed by the processor, cause the processor to display on the differential pressure monitor an indicia representative of the differential pressure between the first and second sensors. A system that includes the differential pressure monitor and the first and second pressure sensors is also disclosed.

Another embodiment disclosed herein is a method of configuring a system. The method comprises obtaining a first pressure sensor and a second pressure sensor, and obtaining a differential pressure monitor comprising a controller that includes a processor disposed in a housing, and a memory storing instructions that, when executed by the processor, cause the processor to pre-calibrate the first pressure sensor and the second pressure sensor before initial use, and determine the differential pressure between the first and second sensors during use of the sensors. The method further includes displaying an indicia representative of the differential pressure between the first and second sensors, and pre-calibrating the first and second pressure sensors by electronically connecting the first and second pressure sensors to the controller.

Yet another embodiment is a method of monitoring a pressure differential across a filter. The method comprises obtaining a first pressure sensor and a second pressure sensor, connecting the first pressure sensor and the second pressure sensor to a differential pressure monitor including a controller comprising a processor disposed in a housing, and a memory storing instructions that, when executed by the processor, cause the processor to pre-calibrate the first pressure sensor and the second pressure sensor before initial use, and determine the differential pressure between the first and second sensors during use of the sensors. The differential pressure monitor is configured to display an indicia representative of the differential pressure between the first and second sensors. The method also includes mounting the first pressure sensor proximate an inlet side of the filter, mounting the second pressure sensor proximate an outlet side of the filter, and monitoring the pressure differential across the filter by viewing the controller display.

Another embodiment is a system comprising a first pressure sensor, a second pressure sensor, and a differential pressure monitor. The differential pressure monitor includes a controller comprising a processor disposed in a housing, and a memory storing instructions that, when executed by the processor, cause the processor to pre-calibrate the first pressure sensor and the second pressure sensor before initial use, and to determine the differential pressure between the first and second pressure sensors during use of the sensors and display an indicia representative of the differential pressure between the first and second pressure sensors.

A further embodiment is a method of monitoring a pressure differential across a filter comprising obtaining a first pressure sensor and a second pressure sensor, connecting the first pressure sensor and the second pressure sensor to a controller comprising a processor disposed in a housing, and a memory storing instructions that, when executed by the processor, cause the processor to pre-calibrate the first pressure sensor and the second pressure sensor before initial use, determine the differential pressure between the first and second sensors during use of the sensors, and display an indicia representative of the differential pressure between the first and second sensors. In embodiments, the method further includes mounting the first pressure sensor proximate an inlet side of the filter, mounting the second pressure sensor proximate an outlet side of the filter, and monitoring the pressure differential across the filter by viewing the indicia.

In some cases, pre-calibrating the first and second pressure sensors comprises connecting the first and second pressure sensors to the differential pressure monitor and to a fluid flow test system that includes a first reference pressure gauge proximate the first pressure sensor and a second reference pressure gauge proximate the second pressure sensor, introducing fluid flow at an upper pressure level to the fluid flow test system while using the processor to determine adjustments for the first and second sensor output signals representing pressure readings in order to match the pressure readings of the first and second reference pressure gauges, and introducing fluid flow at a lower (sometimes atmospheric) pressure level to the fluid flow test system while using the processor to determine adjustments for the first and second sensor output signals representing pressure readings in order to match the pressure readings of the first and second reference press gauges.

DETAILED DESCRIPTION

The embodiments disclosed herein provide a differential pressure monitor with a calibration process and system that is significantly more accurate than the process and system used for factory calibrated transducers. The calibration software has been combined into the differential pressure monitor to provide one packaged product, eliminating the need for additional steps to set up on a system controller.

The embodiments disclosed herein improve system efficiency and/or safety by reducing the margin of error in pressure measurement systems applied to high pressure systems, including refrigeration. In the disclosed embodiments, the margin of error can be reduced from about 1.4% for each sensor down to 0.4%-1.0% for each sensor, or down to 0.4% to 0.8% for each sensor, as compared to when conventional differential pressure monitors are used that have been factory calibrated. In some embodiments in which prior systems allowed for margins of error of ±2.8% at $-40°$ F.$<$T$<-4°$ F. ($-40°$ C.$<$T$<-20°$ C.), $185°$ F.$<$T$<257°$ F. ($85°$ C.$<$T$<125°$ C.) and ±1.4% at $-4°$ F.$<$T$<185°$ F. ($-20°$ C.$<$T$<85°$ C.), the present system will provide for margins of error of ±0.8% at $-40°$ F.$<$T$<-4°$ F. ($-40°$ C.$<$T$<-20°$ C.), $185°$ F.$<$T$<257°$ F. ($85°$ C.$<$T$<125°$ C.) and ±0.4% at $-4°$ F.$<$T$<185°$ F. ($-20°$ C.$<$T$<85°$ C.). The margin of error can be reduced by about 71%, or by about 50%-71%.

The differential pressure monitor disclosed herein has a variety of uses, including in oil separation or filtration systems. The differential pressure monitor and associated system optionally can be used for continuous monitoring. In addition to being useful in refrigeration systems, the differential pressure monitor also can be used in heating, air conditioning and ventilation systems, and compressed air systems.

Considering cases where differential pressure measurements need to be taken, the measurement errors compound as pressure increases, adding to the measurement uncertainty. In some cases, this can hinder the initial setup, normal operation, preventive maintenance, and/or troubleshooting of a high-pressure refrigeration system. Pressure differential measurements can be particularly important around filter elements residing in various applications that remove aerosol oils or sediment particulates from a gas or water flow respectively. Non-limiting examples of systems in which differential pressure is monitored include refrigeration systems, such as coalescing oil separators, dryers, and water filtration systems, including pool filters. In order to address this need, a differential pressure monitor (RDP) is described herein with embedded signal conditioning that results in a robust analog output signal by accounting for power supply and sensor noise and a calibration procedure that allows for more precise measurements even at high operating pressures.

Figure 1:
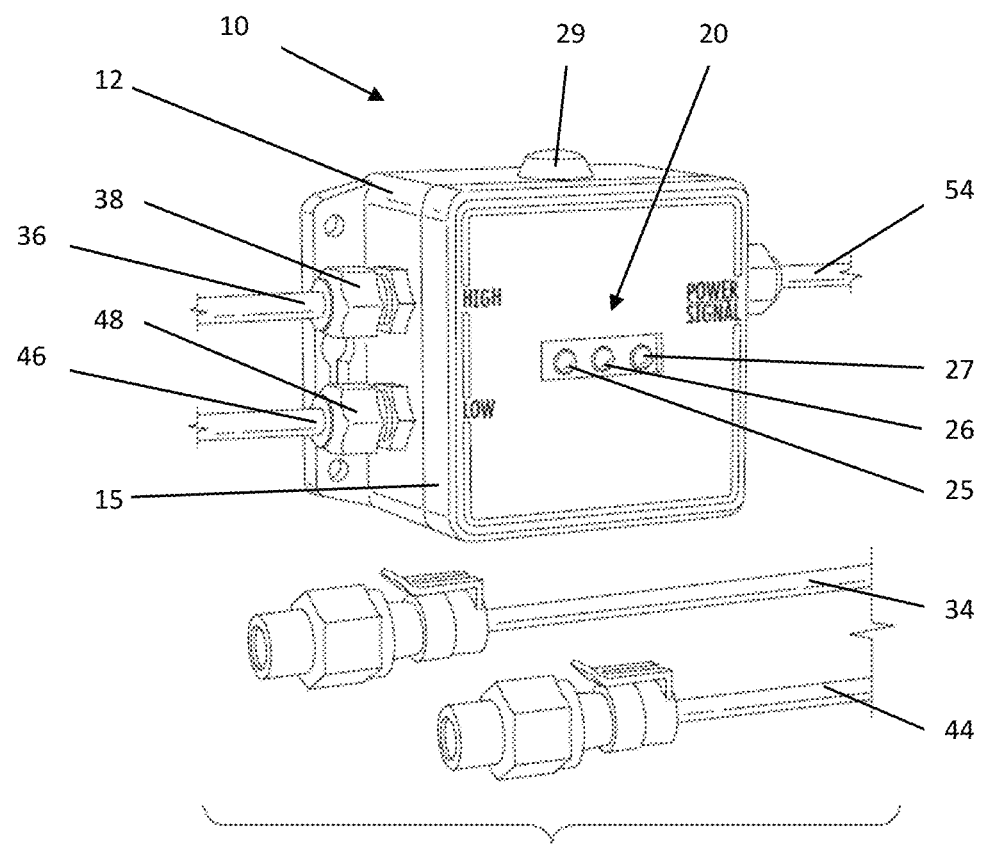
FIG. 1 shows a first embodiment of a differential pressure monitor.
Figure 2:
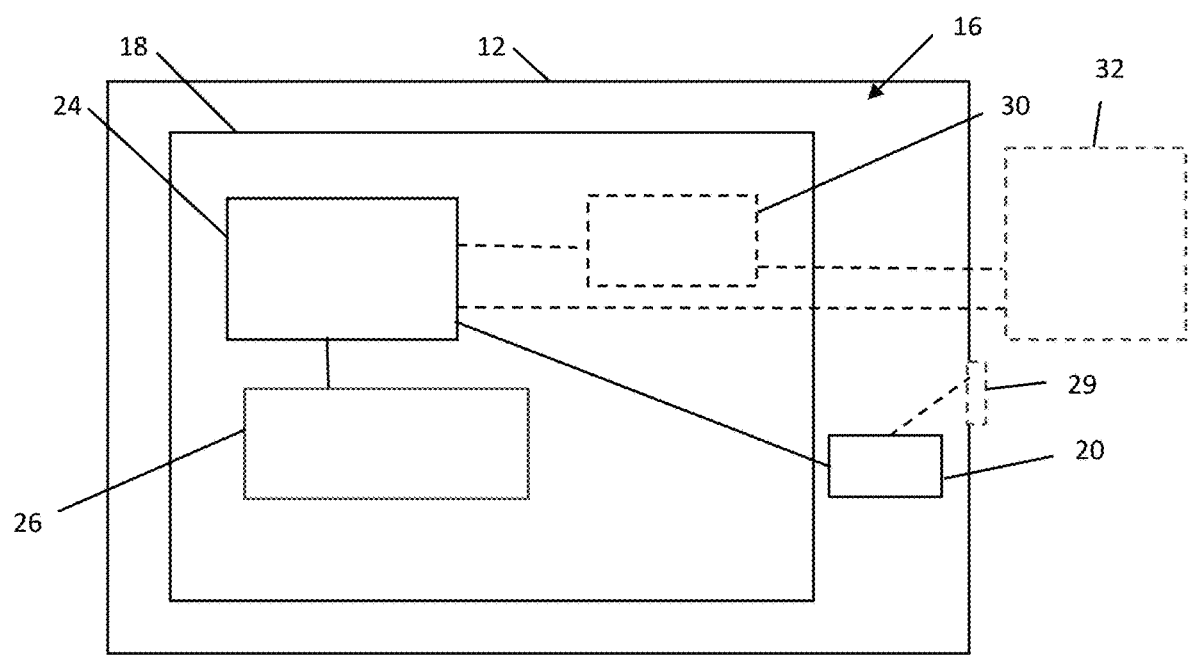
FIG. 2 schematically shows the electronic components of the differential pressure monitor and associated electronic devices.

FIGS. 1-2 show an embodiment of a differential pressure monitor, designated as 10. FIG. 1 shows the exterior of a housing 12 for the differential pressure monitor 10. FIG. 2 schematically depicts the electronic components included in the differential pressure monitor 10. The housing 12 has a pivotable door 15 and contains an electronic system that is generally designated as 16 and is schematically shown in FIG. 2. The electronic system 16 includes a controller 18 and a differential pressure indicator 20, such as, but not limited to, a plurality of colored lights as is shown in FIG. 1, or another communicative visual display. The differential pressure indicator 20 provides an indication as to when an associated filter should be cleaned or replaced. In embodiments, the differential pressure indicator 20 includes a visual display including a first indicia indicating a pressure differential within a target range and a second indicia indicating a pressure differential outside of a target range.

The controller 18 includes a processor 24 and a memory 26. The processor 24 is used to pre-calibrate the pressure sensors and to monitor the pressure difference between the two sensors when the system is in use. In embodiments, the processor 24 provides embedded signal conditioning to reduce at least one of signal noise and sensor noise. In some cases, this is performed by the use of mathematical operations at the software level and noise filtering operations at the hardware level. The memory 26 stores computer software and pressure data. The computer software includes instructions that cause the processor 24 to determine the differential pressure between two sensors and display an indicia representative of the differential pressure between the two sensors. In some embodiments, a communication module 30 is included that is configured to transmit pressure data from the processor 24 to a monitoring computer 32 that is external to the monitor 10. In other cases, a monitoring computer 32 directly communicates with the processor 24. In some embodiments, the connection between processor 24 and monitoring computer 32 is hardwired. In embodiments, the connection between the process 24 and the communication module 30 is hardwired and the connection between the communication module 30 and the monitoring computer 32 is wireless. In some cases, the electronic system 16 further includes a high pressure differential alert reset mechanism 29, optionally connected to the differential pressure indicator 20 and preferably formed on the exterior of the housing 12 to allow the system to be reset after an overpressure has resulted in the system being taken temporarily offline, such as may occur when a pre-determined differential pressure limit has been reached. Typically, but not necessarily, the high pressure differential alert reset mechanism 29 is set to trigger an overpressure alarm if the differential pressure reaches a selected pressure level, which typically is in the range of about 12 PSID to about 20 PSID.

In some cases, such as when the differential pressure monitor is used in a refrigeration system, the monitoring computer 32 also is the main refrigeration controller. In other cases, the monitoring computer 32 is only associated with the differential pressure monitor 10.

Figure 3:
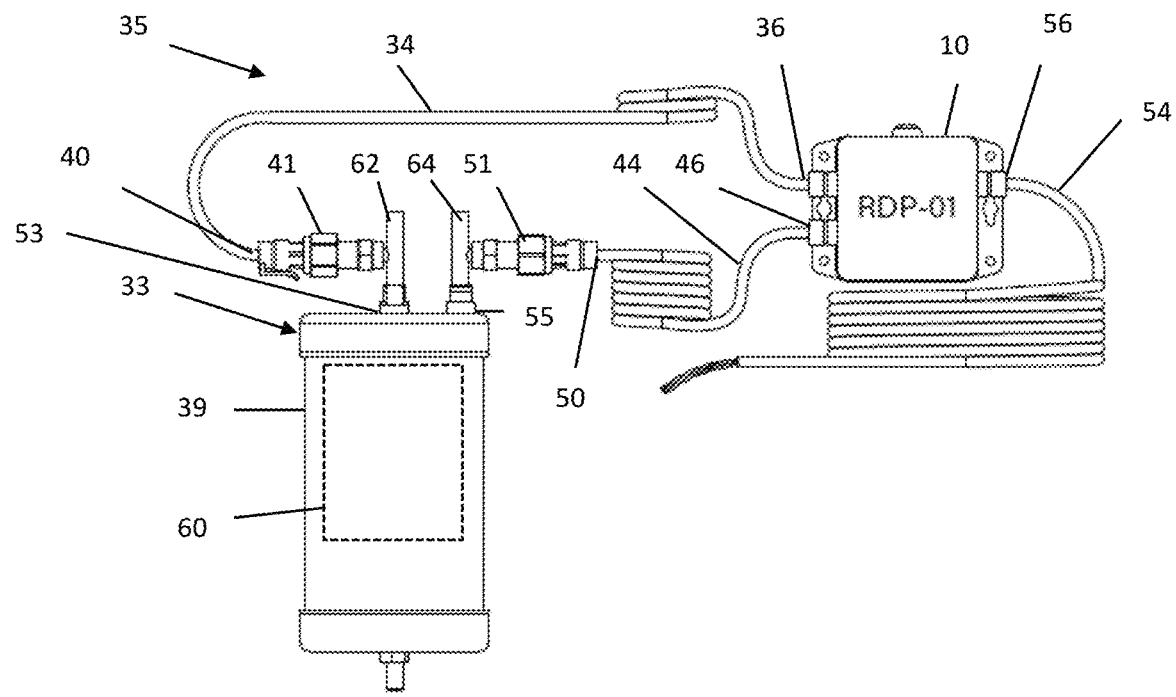
FIG. 3 shows the differential pressure monitor mounted in an oil separation or filtration system.

FIG. 3 shows the monitor 10 associated with a filtration subsystem 33. In addition to the differential pressure monitor 10, the apparatus includes a filter 39. In the system illustrated in FIG. 3, the filter 39 comprises an oil separator. Referring to FIGS. 1 and 3, the differential pressure monitor 10 is connected to a filter 39. The overall combination of the filtration subsystem 33 and the differential pressure monitor 10 is designated as 35. The combined system 35 includes first filter pressure input signal transmission line 34 with a first end 36 mounted to the monitor 10 using a connector 38 and a second end 40 configured to be mounted to a sensor 41 disposed on the upstream side of a filter 39 at a filter inlet 53 with a connector 62, and a second filter pressure input signal transmission line 44 with a first end 46 mounted to the monitor 10 using a connector 48, and a second end 50 configured to be mounted to a second sensor 51 disposed on the downstream side of the filter 39 at a filter outlet 55 with a connector 64. The monitor 10 also includes a differential pressure signal transmission line 54 with a first end 56 mounted to the monitor 10 using a connector 58 and analog output 76 is connected to a main refrigeration control device. The monitor 10 is configured to monitor pressure across filter media 60 included in the filter 39. When the differential pressure reading is within the normal operating range, a first light 25 (typically green) is continuously lit. When the differential pressure reading begins to approach an undesirably high value, a second light 26 (typically yellow) is continuously lit. If the differential pressure reading actually reaches an undesirable value, a third light 27 (typically red) is continuously lit. Lights 25-27 are shown in FIG. 1. In embodiments, the filter is replaced or cleaned when the second light 26 is lit. The warning system typically allows for a reasonable window of time, for example, ranging from 1-5 days, to replace the filter before the pressure differential reaches an undesirable value. When the differential pressure monitor is used in conjunction with a coalescing oil filter, the filter typically is replaced when the pressure differential reaches a particular value, usually a value in the range of about 12 PSID to about 20 PSID. A reset light or button 29 is disposed on the top or side of the housing 12. When this button is pressed, such as after a filter is replaced, the overpressure "red" alarm light is turned off.

FIGS. 5A-5D show bar charts for four different oil separator inlet pressure scenarios (300, 400, 500, and 600 PSIG) plotted against five differential pressure measurement sets between the inlet and the outlet of the separator. The differential pressure measurement sets were obtained with calibrated gauges (reference pressure bars shown on the left side of each trio), non-calibrated pressure transducers (center bar of each trio), and the Calibrated Differential Pressure Gauge (bars shown on the right side of each trio) utilizing the same non-calibrated pressure transducers, after they have been calibrated with the device. The measurements were taken around 20, 15, 10, 5, and 0 PSID as indicated by the reference pressure bars and the results are presented in the form of (average)±(one standard deviation). The Calibrated Differential Pressure Gauge follows the reference pressure significantly closer than the individual non-calibrated pressure transducers in every case. This demonstrates the Calibrated Differential Pressure Gauge's ability to measure a pressure differential more accurately than individual non-calibrated pressure transducers. In addition, the smaller error bars associated with the Calibrated Differential Pressure Gauge highlight the embedded signal conditioning leading to a more stable output signal.

Figure 9:
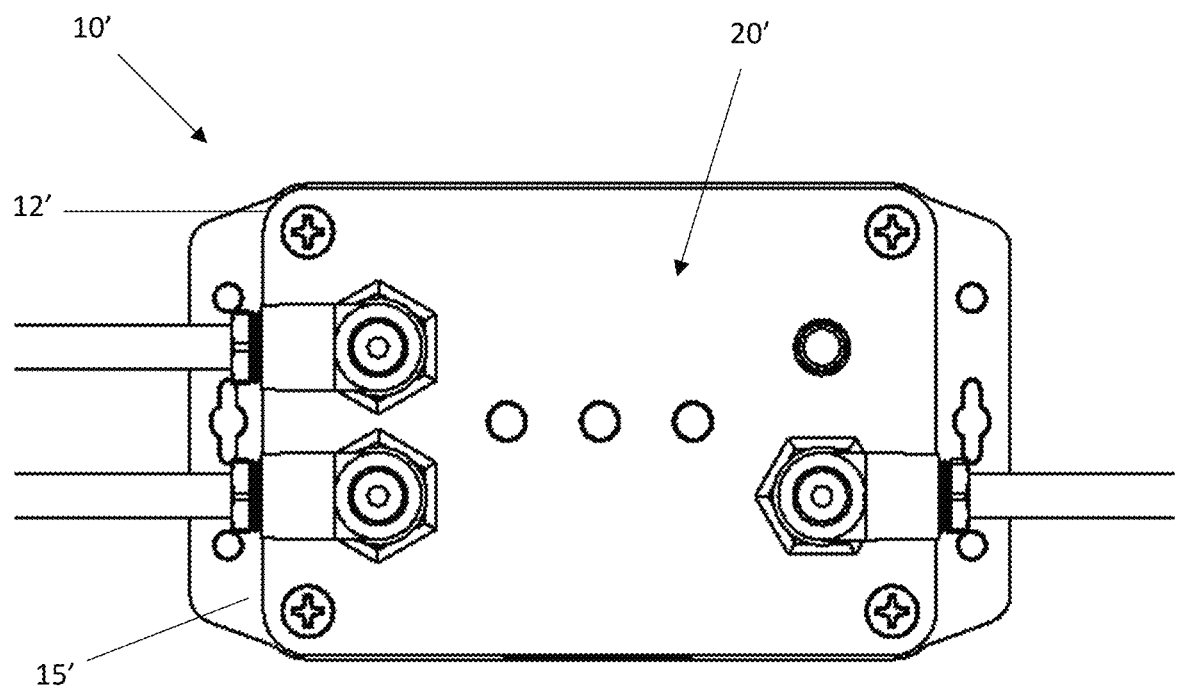
FIG. 9 shows a second configuration of a differential pressure monitor.

FIG. 9 shows a second embodiment of a differential pressure monitor, designated as 10'. The monitor 10' includes a housing 12' and a pivotable door 15'. The front portion of the door 15' has a differential pressure indicator 20', which may include, for examples three lights indicating the status of the filter contained in the associated device. The monitor 10' generally contains the same component parts as the monitor shown in FIG. 1.

In embodiments, the differential pressure monitor uses two transducers 62 and 64, which converts measurements of pressure, i.e. force per unit area, to an analog electrical signal. In embodiments, the pressure difference between the upstream side and the downstream side of a filter is measured. When the pressure difference becomes too high, the operator can change or clean the filter. In some cases, the differential pressure monitor allows for a longer time of filter use before replacement or cleaning, as the margin of error in the pressure differential is reduced. In some cases, the differential pressure monitor is more likely than prior known devices to provide advance warning of a need for filter replacement or cleaning, allowing for increased planning time for filter replacement or cleaning. In many cases, the pressure sensors are temperature compensated sensors.

One embodiment of a differential pressure monitor described herein is configured for use with a coalescing oil separator in a refrigeration system. The compressor in the refrigeration system uses circulating oil for lubrication of metal parts. When the filter element of a coalescing oil separator is contaminated, it negatively effects performance and efficiency—of the oil separator itself, and of the entire system. A differential pressure monitor is used to monitor, both visually and electronically, when the filter is contaminated and needs to be replaced.

One embodiment of the differential pressure monitor features a multicolored readout, such as an LED readout, indicating pressure range and an analog output for precise pressure monitoring. In some cases, the housing for the device is resistant to dust and/or weather resistant.

In some cases, the coalescing oil separator uses a filter media comprising a molecular sieve desiccant, such as a zeolite molecular sieve desiccant, paper, fiberglass, thermoplastic material and combinations thereof. In embodiments, the oil separator includes a housing containing one or more filtration media packs.

In some cases, the differential pressure monitor includes a controller configured to pre-calibrate the first and second pressure sensors to yield a margin of error of no more than 1.2%, or 0.4-1.2%, in differential pressure readings in a system operating in the range of 0 PSIA to 2000 PSIA and −40° F.<T<257° F. In certain embodiments, the controller is configured to pre-calibrate the first and second pressure sensors to yield a margin of error of no more than 1.2%, or 0.4-1.2%, in differential pressure readings in a system operating in the range of 0 to 800 PSIG and 180 to 290 Deg. F.

In embodiments, the differential pressure monitor includes a controller configured to pre-calibrate the first and second pressure sensors to yield a margin of error of no more than 2.6%, in differential pressure readings in a system operating in the range of 0 PSIA to 2000 PSIA at −45 to 0 Deg. C., or 1.0% to 2.3%, or 0.4% to 2% in this temperature range. In certain embodiments, the controller is configured to pre-calibrate the first and second pressure sensors to yield a margin of error of no more than 2.6%, or 1.0% to 2.3%, or 0.4% to 2% in differential pressure readings in a system operating in the range of 0 to 800 PSIG and −45 to 0 Deg. C. In embodiments, the monitor is configured to provide continuous differential pressure monitoring.

In embodiments, the monitor 10 is configured to sense differential pressure in a fluid flow system that operates in the range of 0 PSIA to 2000 PSIA, or about 25 to about 1300 PSIA, or about 50 to about 600 PSIA, or about 900 PSIA to about 2000 PSIA. In embodiments, the monitor 10 is configured to sense differential pressures in a fluid flow system that operates in a range of about 300 PSIG to about 1300 PSIG, or about 400 PSIG to about 1100 PSIG, or about 400 to about 800 PSIG.

NON-LIMITING EXAMPLES OF FEATURES & SPECIFICATIONS FOR ONE EMBODIMENT OF A DIFFERENTIAL PRESSURE MONITOR, SUCH AS THE MONITOR SHOWN IN FIG. 1

Figure 8:
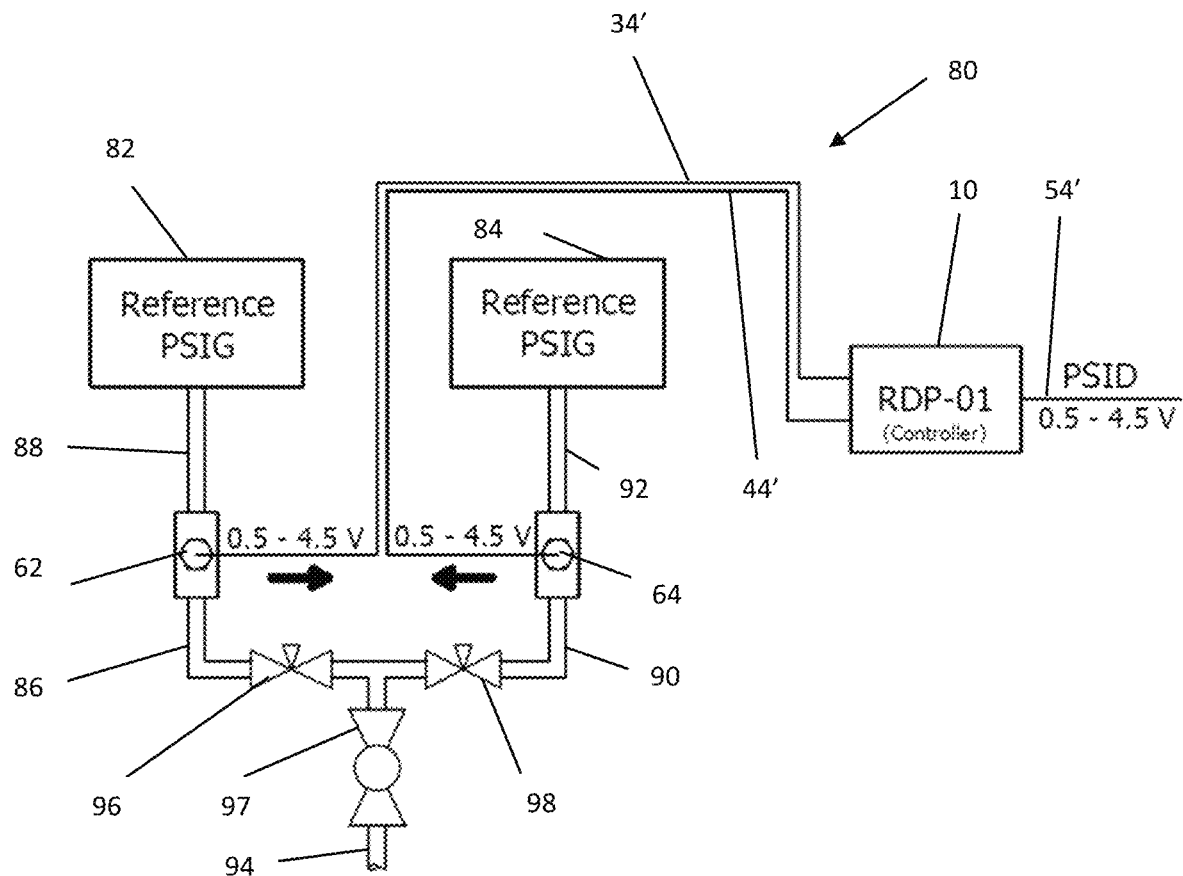
FIG. 8 shows the test stand for collection of the data of FIGS. 5A-5D.

Power supply: 10-24V AC or DC 6' power cable included (24 AWG)
Analog output for pounds per square inch differential (PSID) Monitoring 0.5-4.5V at 0-20 PSID range, Minimum accepted load: 500 ohms
Amp Draw: 30 mA
Operating Temperature: −50° F. to 257° F. (−45.5° C. to 125° C.), or −40° F. to 175° F. (−40° C. to 79° C.)
Heavy-Duty Pressure Transducers
  Brass Housing
  Port: 7/16-20 UNF 1/4" 45° Flare Female Schrader (SAE J512)
  Temperature compensated
  6' cable included
Multicolor LEDs for quick visual monitoring
  Green LED: 0-10 PSID, or 0-8 PSID
  Yellow LED: 8-15 PSID, or 8-12 PSID, or 10-15 PSID
  Red LED: >12 PSID, or >15 PSID, or >21 PSID
  Blinking Red LED indicates overpressure
  Blinking Yellow LED indicates disconnected pressure transducer. Turns off after transducer connection is restored.
  Overpressure indicator remains on until manually reset. Device remains active to continue monitoring PSID.
  Overpressure indicator reset button is located on side of case
Mounting Screws Included
Weather and dust-resistant case
Factory Calibrated
Sensor Calibration Prior to Installation and Use The differential pressure monitor has software embedded therein for pre-calibration of the sensors before they are installed and used in a system. In embodiments, pre-calibration takes place at a location remote from the system where pressure monitoring is to take place. FIG. 8 shows a non-limiting embodiment of a test set-up that can be used for calibration. More specifically, FIG. 8 shows a test stand for one embodiment for making differential pressure measurements. The test stand is generally designated at 80. A first sensor 62 and a second sensor 64 are each mounted proximate to a first reference pressure gauge 82 and a second reference pressure gauge 84, respectively. The first sensor 62 is connected to the differential pressure monitor 10 via line 34' and the second sensor 64 is connected to the differential pressure monitor 10 via line 44'. A maximum operating pressure is applied to the first sensor 62 and the first reference gauge 82 and the second sensor 62 and the second reference pressure gauge 84 using by a test fluid such as nitrogen in lines 86 and 88. The pressure level is generated by sending the nitrogen test fluid through line 94 with valves 96 97 and 98 open. The pressure reading for the first sensor 62 is compared to that of the corresponding reference gauge 82, and the pressure for the second sensor 64 is compared to that of the corresponding reference gauge 84. Software in the differential pressure monitor adjusts the output from the differential pressure monitor that is indicative of pressure to precisely correspond to the differential pressure reading from the reference pressure gauges 82, 84. A test fluid also is used at a minimum operating pressure. Again, at the minimum pressure level, the pressure reading for the first sensor 62 is compared to that of the corresponding reference gauge 82, and the pressure for the second sensor 64 is compared to that of the corresponding reference gauge 84. Software in the differential pressure monitor adjusts the output from the differential pressure monitor that is indicative of pressure to precisely correspond to the differential pressure reading from the reference pressure gauges 82, 84.

Thus, when the sensors 62, 64 are installed in a system, the differential pressure monitor will have been pre-programmed to adjust for small differences between the pressure readings obtained from the first and second sensors and the actual pressures. This provides advantages to the user of the differential pressure monitor in that they can install the differential pressure monitor knowing that the particular sensors provided with the monitor have been pre-calibrated with the monitor to ensure that highly accurate measurements are provided.

Method of Installation

In one embodiment described herein, the differential pressure monitor is installed on a coalescing oil filter of a refrigeration system, also applicable to various applications involving a filter element, using the following instructions:
  1. Disconnect the pressure transducer brass body from the black cable fitting by carefully lifting the clip and pulling to separate the two parts. This will make the installation significantly easier by allowing the brass body to be screwed into the male connection and tightened without twisting the cables.
  2. Place the provided copper gasket into the pressure transducer female connection.
  3. Mount one pressure transducer brass body on a 7/16-20 UNF 1/4" 45° flare male Schrader port located as close to the coalescing oil separator inlet (high side) as possible and hand tighten. Make sure the copper gasket does not fall off during the process.
  4. Using two wrenches, secure the 1/4" male flare while tightening the pressure transducer. Apply up to 40 ft-lbs torque to ensure a leak-free connection.
  5. Repeat steps 3 and 4 with the second pressure transducer for the outlet (low side) of the coalescing oil separator.
  6. Reconnect the pressure transducer cable to the brass body. Connect the cable corresponding to the high-pressure transducer placed by the oil separator inlet and the low pressure cable to the pressure transducer on the outlet of the oil separator (See FIG. 3).
  7. The unit is now ready to be powered on.

Note: If the above process is being done after the unit has been turned on, the disconnected transducer indication will turn on. In addition, the analog output reading will be reliable only after both pressure transducers have been reconnected.

Electronics Wiring

Figure 4:
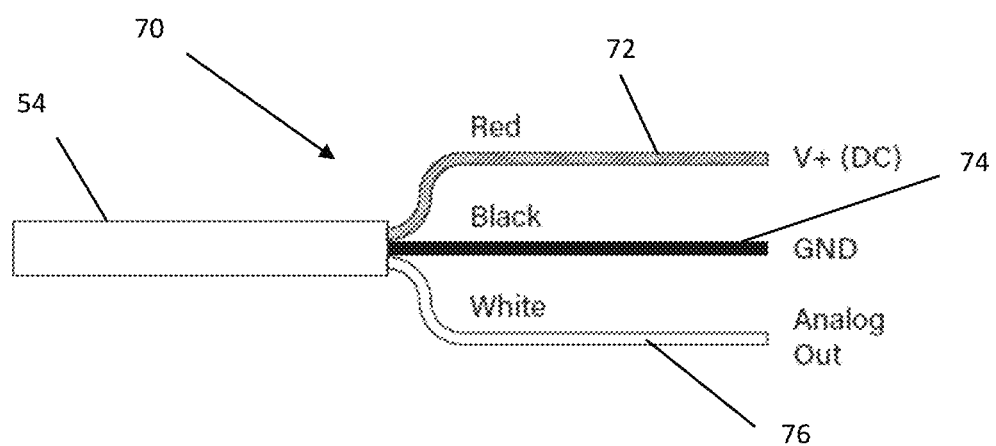
FIG. 4 shows the wiring for the monitor shown in FIG. 3.
Figure 5A:
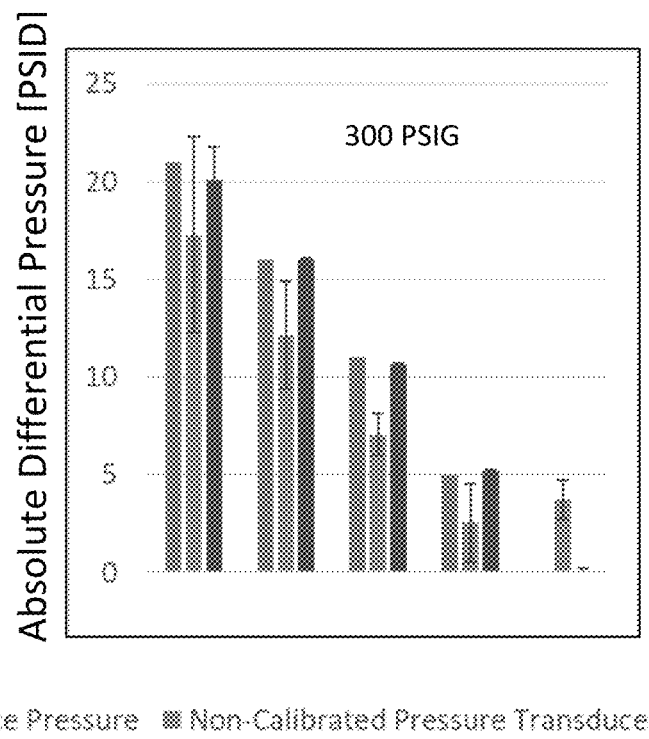
FIGS. 5A-5D show data comparing the accuracy of the differential pressure monitor shown in FIG. 1 to the accuracy of a conventional differential pressure monitor.
Figure 5B:
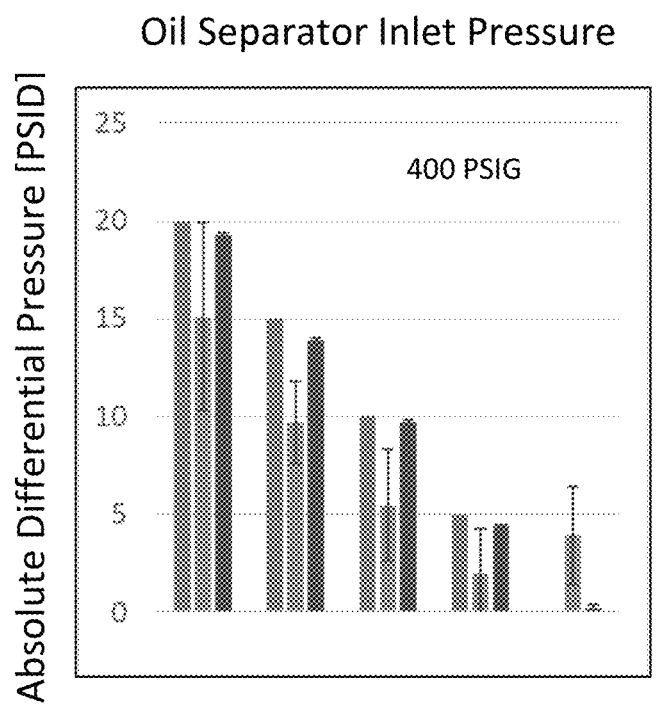
Figure 5C:
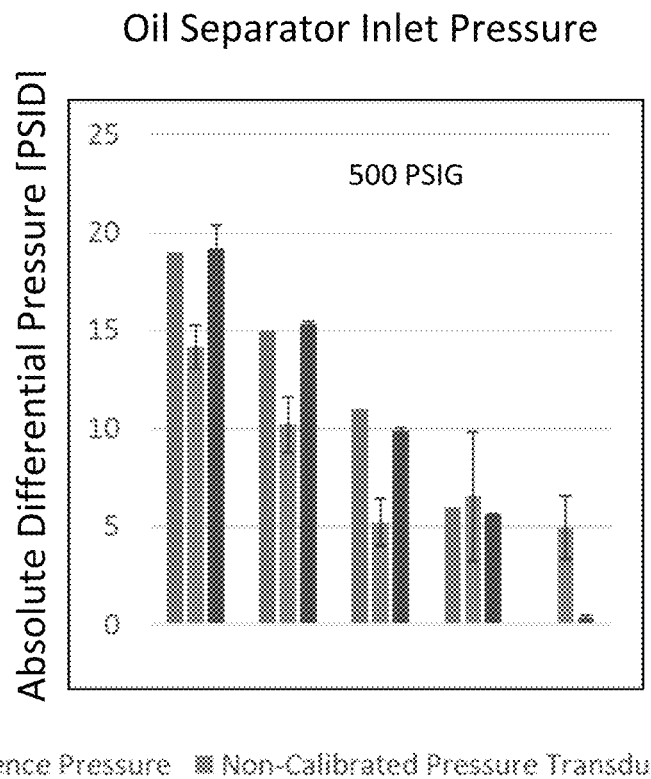
Figure 5D:
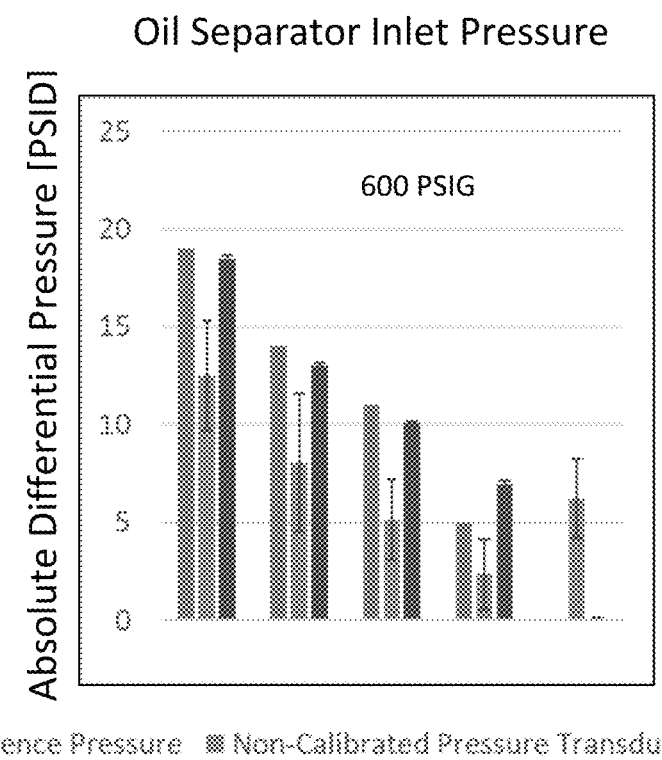
Figure 6A:
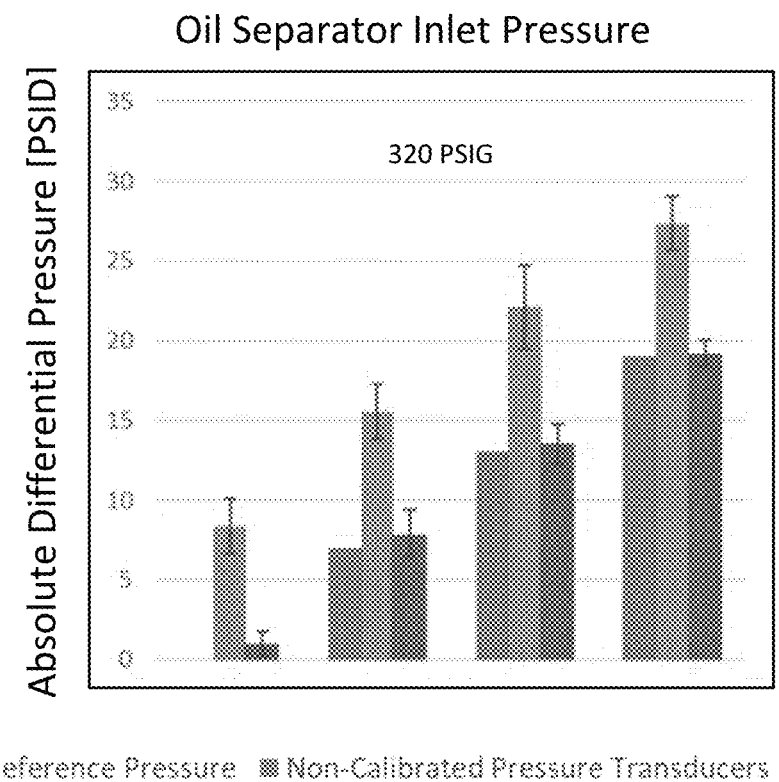
FIGS. 6A-6D show data comparing the accuracy of the differential pressure monitor shown in FIG. 9 or FIG. 1 to the accuracy of a conventional differential pressure monitor for a system designed to operate at up to 2000 PSIA.
Figure 6B:
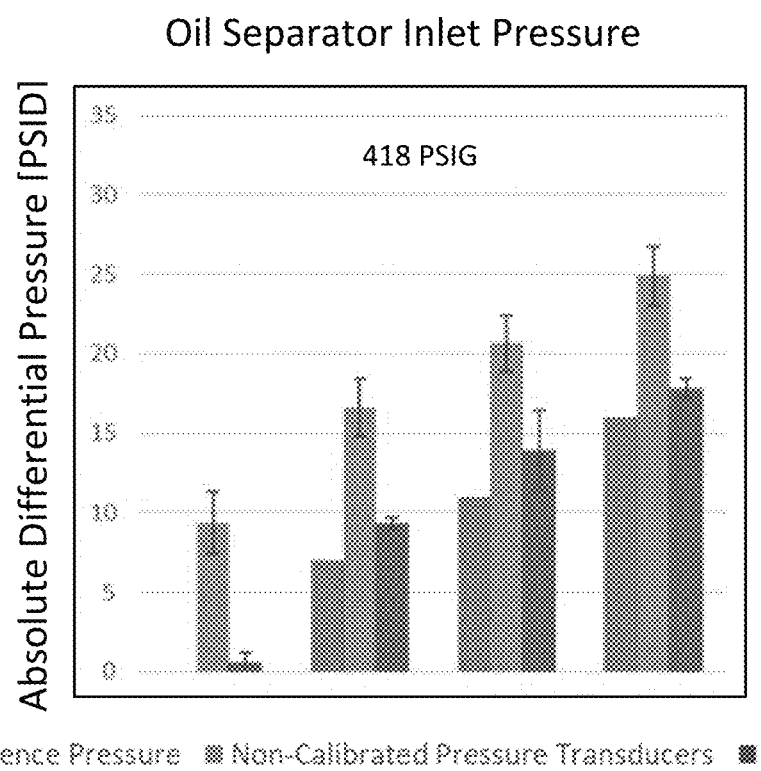
Figure 6C:
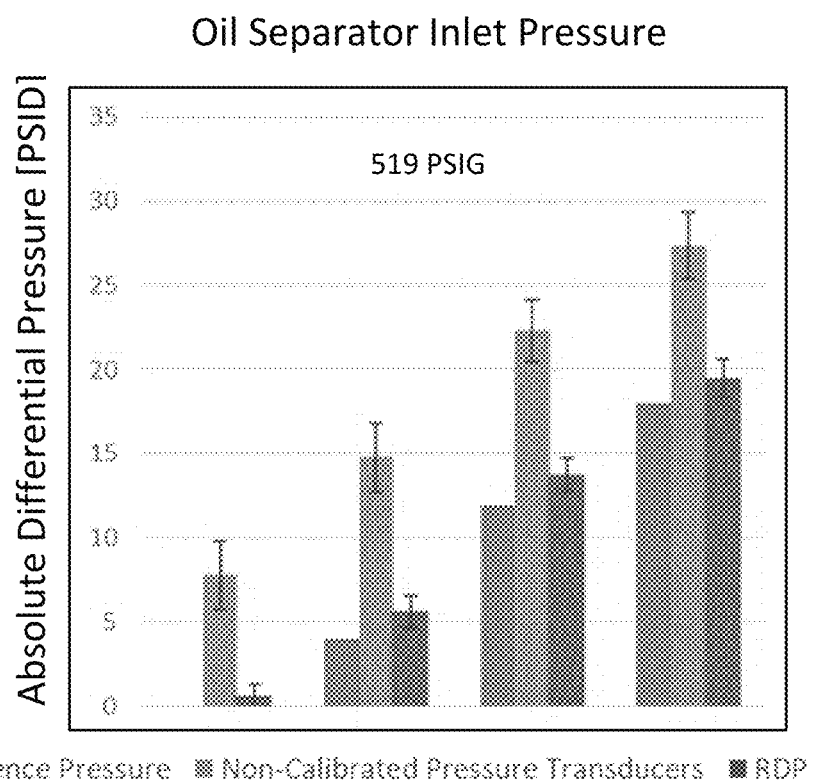
Figure 6D:
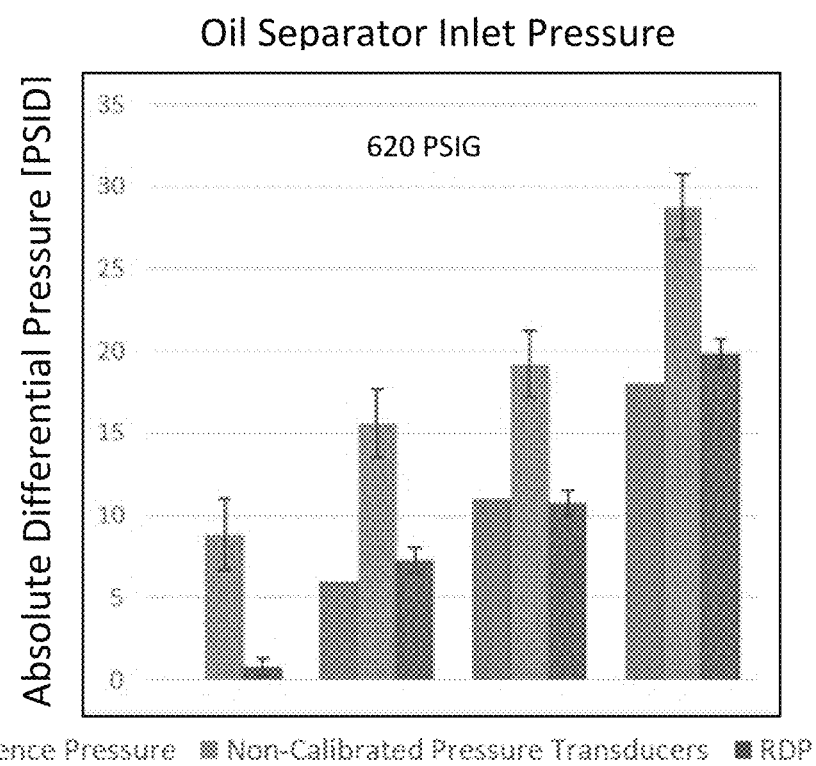

In one embodiment, the following instructions can be used to wire the differential pressure monitor:
  1. Using the supplied wiring diagram, (See FIG. 4) connect the differential pressure monitor to the power supply and rack controller using the wiring system 70 as follows:
    a. Connect positive voltage or live wire (10-24 V DC or AC) to RED wire 72.
    b. Connect common ground or neutral to BLACK wire 74.

c. Connect analog out (WHITE wire 76, 0.5-4.5V) to main controller (if available), i.e. a monitoring computer 32.

2. Switch on the power supply to power on the unit.
3. Unit is now ready for service.

In some embodiments, analog line 76 is substituted by a wireless connection. This is the case, for example, when the monitoring computer is a smartphone or other wireless computer.

Operation

One embodiment of the differential pressure monitor operates as follows:

The unit begins monitoring and outputting PSID as soon as it is powered on. No startup operation takes place. •When the pressure differential enters the overpressure region (in some cases PSID>12) the Red LED starts blinking, while the device continues to monitor PSID. •If the pressure differential drops below the overpressure region after an overpressure indication has been triggered, the Red LED will continue to blink until it is manually reset. •To reset the overpressure indicator, press and hold the red reset button located on the side of the case for no less than 2 seconds. •Note that the blinking Red LED (overpressure indicator) will not affect the analog output of the unit in any way. This is only a visual indicator. If an electronic alarm is desired, this can be done through the main controller by using the analog output of the unit and setting the alarm at the PSID (output voltage) required by the user within the a suitable analog output range, for example, within the 0-20 PSID analog output range.

Comparative Data

FIGS. 5A-5D depict five sets of differential pressure measurements taken at four different pressures simulating the inlet and outlet pressure of a coalescing oil separator. Specifically, the embodiments presented here represent a coalescing separator filter element that begins clean with 0 pounds per square inch differential (PSID) across the inlet and outlet, but gets progressively dirtier with the pressure drop increasing up to 20 PSID. Three differential pressure measurements were taken for every pressure drop at every inlet pressure with:

left bars: calibrated gauges (SSI Technologies, MediaGauge™) that come with a calibration certificate and are labeled as reference pressure middle bars: non-calibrated pressure transducers (Honeywell PX3AF1BH667PSAAX)

right bars: the REFRI-SHIELD Differential Pressure Monitor (RDP) utilizing the same Honeywell transducers.

The calibrated gauges (left bars) are considered as the most accurate pressure measurement in this example. The other two cases will be compared against them by attaching the second set of transducers right next to the gauges in order to have them exposed to the same pressure.

The non-calibrated Honeywell pressure transducer measurements, the results of which are shown by the middle bars, were taken by following the manufacturer's instructions about their signal output (0.5-4.5 V at 0-667 PSIG). The RDP was calibrated using the same Honeywell transducers in order to demonstrate the effectiveness of the device in reducing the measurement error.

The new pressure measurement process, shown by the right bars, involves the following:

1. Reaching the target pressure differential according to the calibrated gauges

2. Taking sequential pressure measurements with the same set of transducers using a data acquisition system (NI-9201)
   a. configured according to the regular signal output in the manufacturer's instructions (0.5-4.5 V at 0-667 PSIG)
   b. according to the RDP output signal calibrated against the same Honeywell transducers.

The results are presented in the form of [mean value]± [one standard deviation].

It is evident in FIGS. 5A to 5D that in all four inlet pressures and all differential pressure cases the right side bars that correspond to the RDP follow the left bars a lot more closely than the middle bars that correspond to the non-calibrated version of the transducers. There are cases where the non-calibrated transducers show up to a 7 PSID discrepancy from the reference pressure values, including the data at 19 PSID and 600 PSIG. However, the highest RDP difference from the reference values was no more than 2 PSID, while in most cases it follows the reference pressure closer than 1 PSID. This is a direct result of the calibration procedure followed by the Differential Pressure (RDP) monitor. In addition, the error bars associated with the RDP are significantly smaller than the non-calibrated pressure transducers, as a result of the Differential Pressure RDP signal conditioning. Evidently, the RDP can significantly increase the differential pressure measurement accuracy in high pressure systems.

FIGS. 6A-6D show bar charts for four different oil separator inlet pressure scenarios (320, 418, 519, and 620 PSIG) plotted against four differential pressure measurement sets between the inlet and the outlet of the separator using transducers able to operate up to 2000 PSI (also known as transducer FSS=2000 PSIG). The differential pressure measurement sets were obtained with calibrated gauges (reference pressure bars shown on the left side of each trio), non-calibrated pressure transducers (center bar of each trio), and the Calibrated Differential Pressure Gauge (bars shown on the right side of each trio) utilizing the same non-calibrated pressure transducers, after they have been calibrated with said device. The measurements were taken around 15-19, 10, 5, and 0 PSID as indicated by the reference pressure (left) bars and the results are presented in the form of (average)±(one standard deviation). The Calibrated Differential Pressure Gauge follows the reference pressure significantly closer than the individual non-calibrated pressure transducers in every case. This demonstrates the Calibrated Differential Pressure Gauge's ability to measure a pressure differential more accurately than individual non-calibrated pressure transducers. In addition, the smaller error bars associated with the Calibrated Differential Pressure Gauge highlight the embedded signal conditioning leading to a more stable output signal. The test pressures are generally the same as the test pressures used for the differential pressure monitor configured for lower pressure use (FIGS. 5A-5D) for testing convenience. The present system provides accuracy of ±1.2% FSS at −40° F.<T<257° F., where FSS=2000 PSIG, as compared to a conventional system which has ±2.8% FSS at −40° F.<T<257° F.

Figure 7:
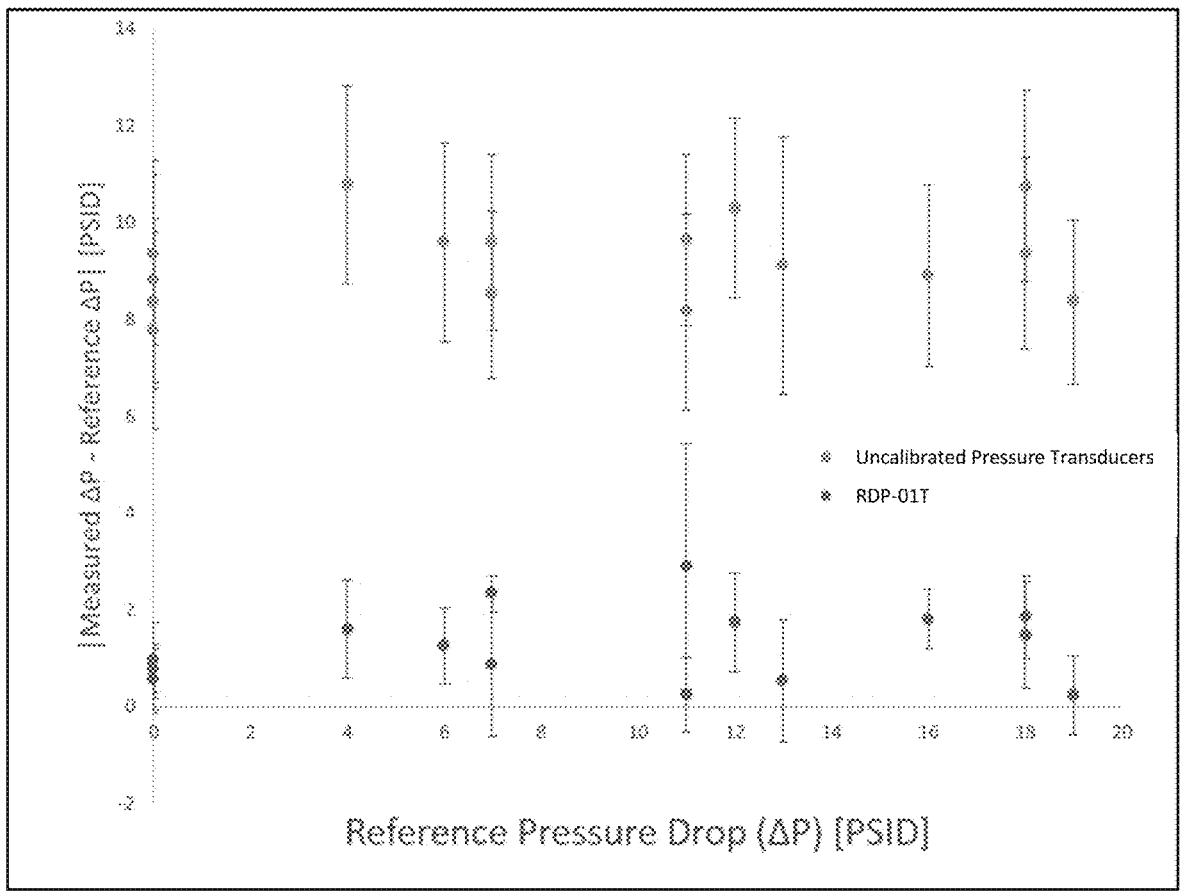
FIG. 7 is a test pressure trend analysis figure in accordance with embodiments disclosed herein.

The graph shown in FIG. 7 is a variation of the bar charts shown in FIGS. 6A-6D and shows that the results are independent of the separator inlet pressure. Thus, this chart shows that the same level of accuracy can be achieved for pressures near 2000 PSIG and 2000 PSIA as for pressures near 800 PSIG. The results are plotted on FIG. 7 as the mean value of the difference between the measured pressured differential and the reference pressure differential versus the reference pressure differential. The error bars correspond to ±(one standard deviation). Uncalibrated pressure transducer results are shown by the light gray circles, while calibrated pressure transducer results are shown by the dark gray circles. It is evident from this graph that there is a significant deviation between the uncalibrated results and the Calibrated Differential Pressure Monitor reading across the whole pressure differential range, with the Calibrated Differential Pressure Monitor reading being far more accurate. In addition, by observing the mean values and their corresponding error bars for the 2 different cases (uncalibrated vs Calibrated Differential Pressure Monitor), it is clear that there is statistical significance between those two sets of data, as two very distinct data clusters are observed. However, that is not the case when looking at each data set individually where multiple separator inlet pressures were explored. There does not appear to be a clear trend between different separator inlet pressures, as the mean values with their corresponding error bars fully overlap. This means that the results are not dependent on separator inlet pressure and the accuracy trends shown in both graphs presented so far are expected to remain the same outside the range of separator inlet pressures explored in the experiments that have been conducted and shown in FIGS. 5A-5D, 6A-6D and 7.

A number of alternatives, modifications, variation or improvements therein may be subsequently made by those skilled in the art, which are also intended to be encompassed by the following claims.

What is claimed is:

1. A differential pressure monitor, comprising:
a controller comprising a processor disposed in a housing, and a memory storing instructions that, when executed by the processor, cause the processor to:
pre-calibrate a first pressure sensor and a second pressure sensor before initial use, and
determine the differential pressure between the first and second pressure sensors during use of the sensors, and display an indicia representative of the differential pressure between the first and second pressure sensors.

2. The differential pressure monitor of claim 1, wherein the controller is configured to pre-calibrate the first and second pressure sensors to yield a margin of error of no more than 1.2% in differential pressure readings in a system operating in the range of 0 PSIA to 2000 PSIA and 180 to 290 Deg. F.

3. The differential pressure monitor of claim 1, wherein the controller is configured to pre-calibrate the first and second pressure sensors to yield a margin of error of no more than 1.2% in differential pressure readings in a system operating in the range of 0 to 800 PSIG and 180 to 290 Deg. F.

4. The differential pressure monitor of claim 1, wherein the controller is configured to pre-calibrate the first and second pressure sensors to yield a margin of error of no more than 2.6% in differential pressure readings in a system operating in the range of 0 PSIA to 2000 PSIA and −49 to 32 Deg. F (−45 to 0 Deg. C.).

5. The differential pressure monitor of claim 1, wherein the controller is configured to pre-calibrate the first and second pressure sensors to yield a margin of error of no more than 2.6% in differential pressure readings in a system operating in the range of 0 to 800 PSIG and −49 to 32 Deg. F (−45 to 0 Deg. C.).

6. The differential pressure monitor of claim 1, wherein the monitor is configured to provide continuous differential pressure monitoring.

7. The differential pressure monitor of claim 1, wherein the processor provides embedded signal conditioning to reduce at least one of signal noise and sensor noise.

8. The differential pressure monitor of claim 1, further comprising a communication module configured to transmit pressure data in the form of an analog output from the processor to a monitoring computer.

9. The differential pressure monitor of claim 1, further including a reset mechanism connected to an overpressure indicator.

10. The differential pressure monitor of claim 1, wherein the monitor is configured to sense differential pressures in a fluid flow system that operates in a range of 0 PSIA to 2000 PSIA.

11. The differential pressure monitor of claim 1, wherein the monitor is configured to sense differential pressures in a fluid flow system that operates in a range of about 300 PSIG to about 1300 PSIG.

12. The differential pressure monitor of claim 1, wherein the monitor includes a differential pressure indicator comprising a visual display including a first indicia indicating a pressure differential within a target range and a second indicia indicating a pressure differential outside of a target range.

13. The differential pressure monitor of claim 1, wherein the memory is disposed in the housing.

14. The differential pressure monitor of claim 1, wherein the first and second pressure sensors include analog output devices configured to generate an output indicative of differential pressure between upstream and downstream sides of a filter.

15. The differential pressure monitor of claim 1, wherein the first pressure sensor is positioned upstream from a filter element and the second pressure sensor is positioned downstream from the filter element.

16. A system comprising;
a first pressure sensor,
a second pressure sensor, and
a differential pressure monitor comprising:
a controller comprising a processor disposed in a housing, and a memory storing instructions that, when executed by the processor, cause the processor to:
pre-calibrate the first pressure sensor and the second pressure sensor before initial use, and
determine the differential pressure between the first and second pressure sensors during use of the sensors, and display an indicia representative of the differential pressure between the first and second pressure sensors.

17. The system of claim 16, wherein the first and second pressure sensors comprise transducers.

18. The system of claim 16, wherein the controller is configured such that pre-calibration takes place at a location remote from the location of use of the differential pressure monitor.

19. A method, comprising:
obtaining a first pressure sensor and a second pressure sensor,
obtaining a differential pressure monitor, comprising:
a controller comprising a processor disposed in a housing, and a memory storing instructions that, when executed by the processor, cause the processor to:

pre-calibrate the first pressure sensor and the second pressure sensor before initial use, and determine the differential pressure between the first and second pressure sensors during use of the sensors, and display an indicia representative of the differential pressure between the first and second pressure sensors, and pre-calibrating the first and second pressure sensors by electronically connecting the first and second pressure sensors to the controller.

20. The method of claim 19, wherein pre-calibrating the first and second pressure sensors comprises:

connecting the first and second pressure sensors to the differential pressure monitor and to a fluid flow test system that includes a first reference pressure gauge proximate the first pressure sensor and a second reference pressure gauge proximate the second pressure sensor, introducing fluid flow at an upper pressure level to the fluid flow test system while using the processor to determine adjustments for the first and second sensor output signals representing pressure readings in order to match the pressure readings of the first and second reference pressure gauges, and introducing fluid flow at a lower pressure level to the fluid flow test system while using the processor to determine adjustments for the first and second sensor output signals representing pressure readings in order to match the pressure readings of the first and second reference pressure gauges.

\* \* \* \* \*